3,534,167
MULTIPLE DISPLAY COMPARISON METHOD
AND APPARATUS
John A. O'Brien, Reading, Mass., assignor to Itek Corporation, Lexington, Mass., a corporation of Delaware
Filed Aug. 31, 1967, Ser. No. 664,720
Int. Cl. H04n 5/14, 7/18, 9/54
U.S. Cl. 178—6.8          38 Claims

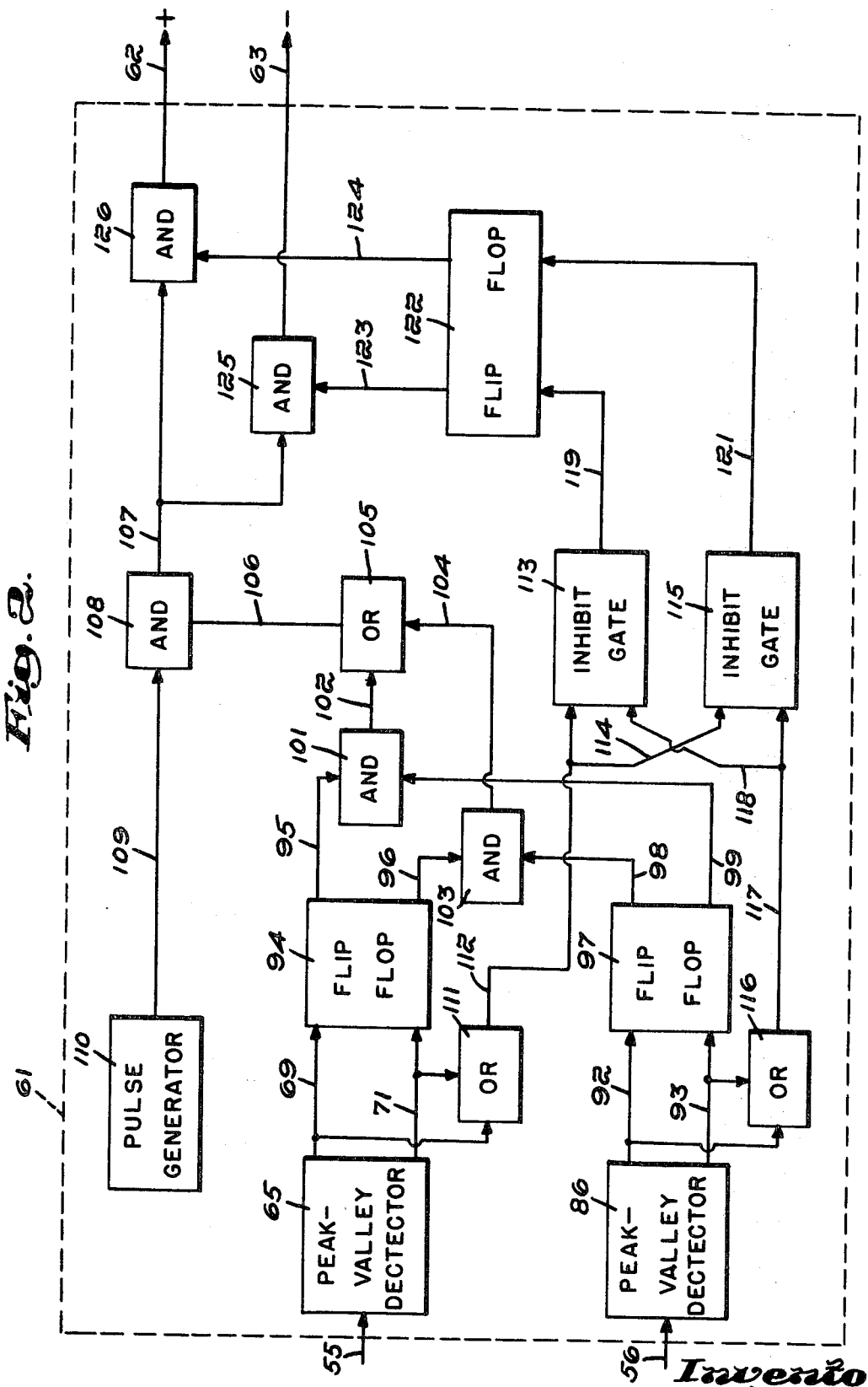

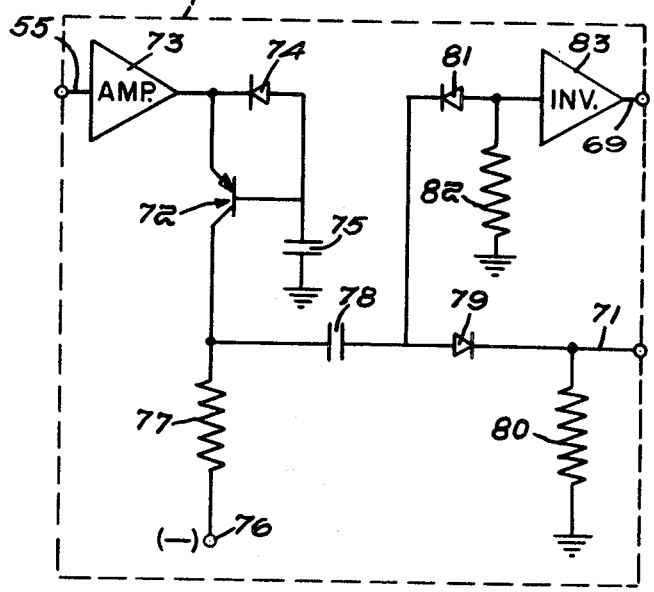
Fig.2a.
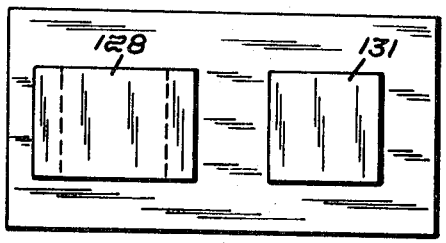
Fig.8.
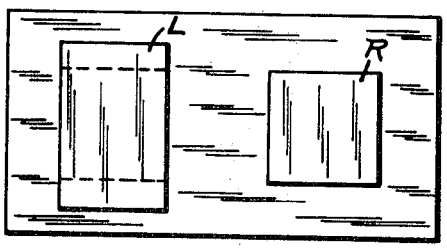
Fig.9.
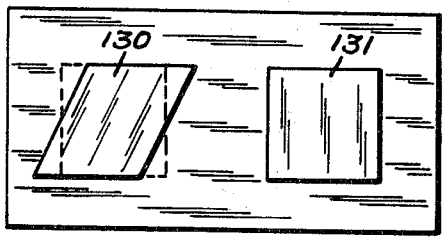
Fig.10.
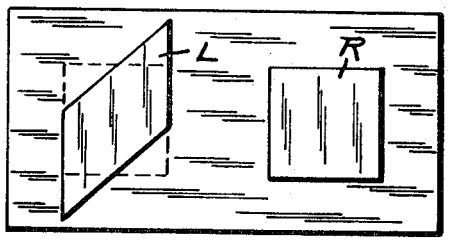
Fig.11.
Fig.3.
| | | | | |
|---|---|---|---|---|
| LINE 95 | o | o | + | + |
| LINE 98 | o | + | o | + |
| LINE 96 | + | + | o | o |
| LINE 99 | + | o | + | o |
| LINE 102 | o | o | + | o |
| LINE 104 | o | + | o | o |
| LINE 106 | o | + | + | o |
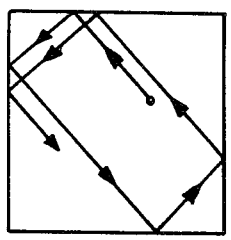
Fig.12.
Inventor:
John A. O'Brien,
by John E. Toupal
Attorney

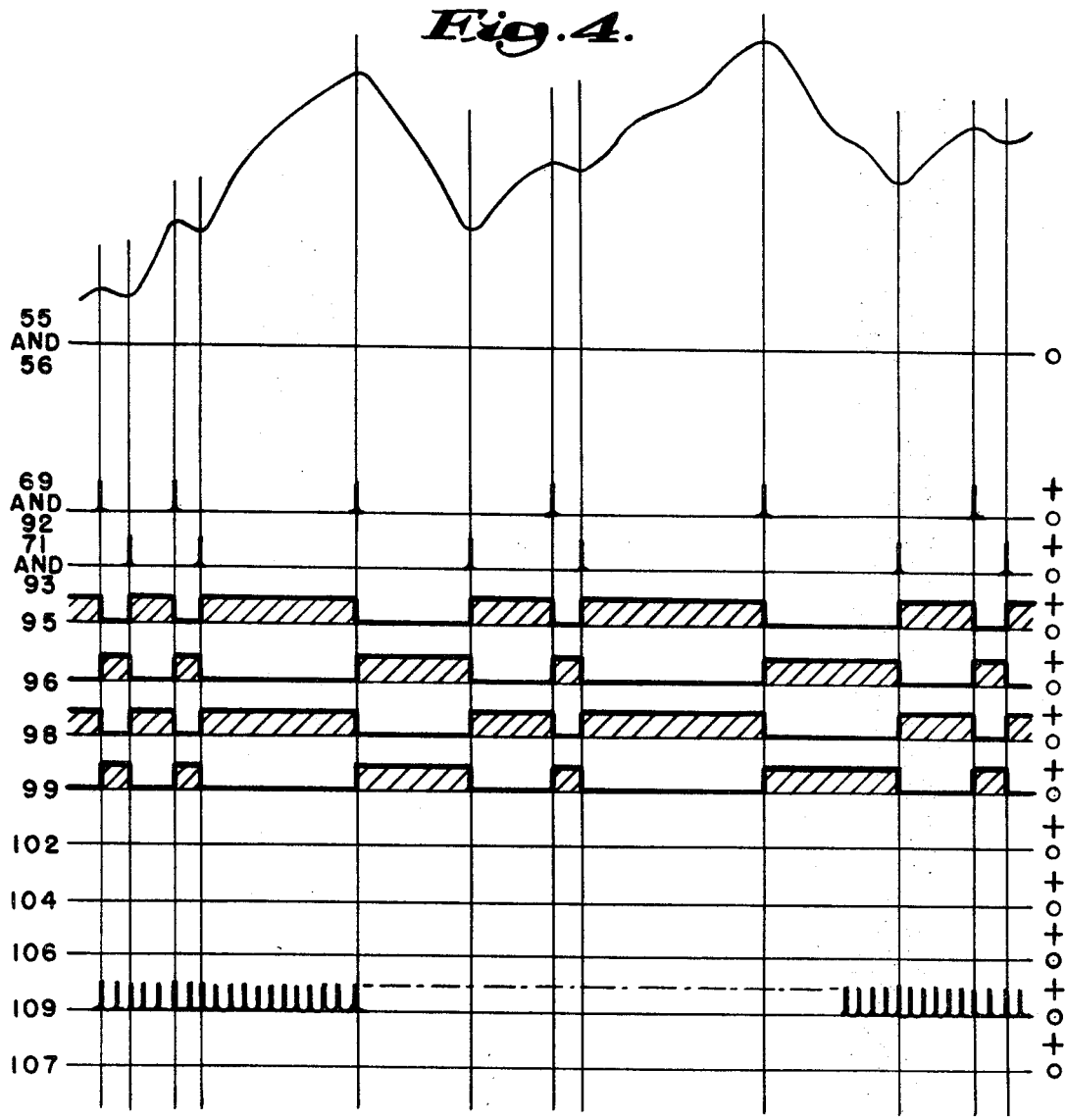

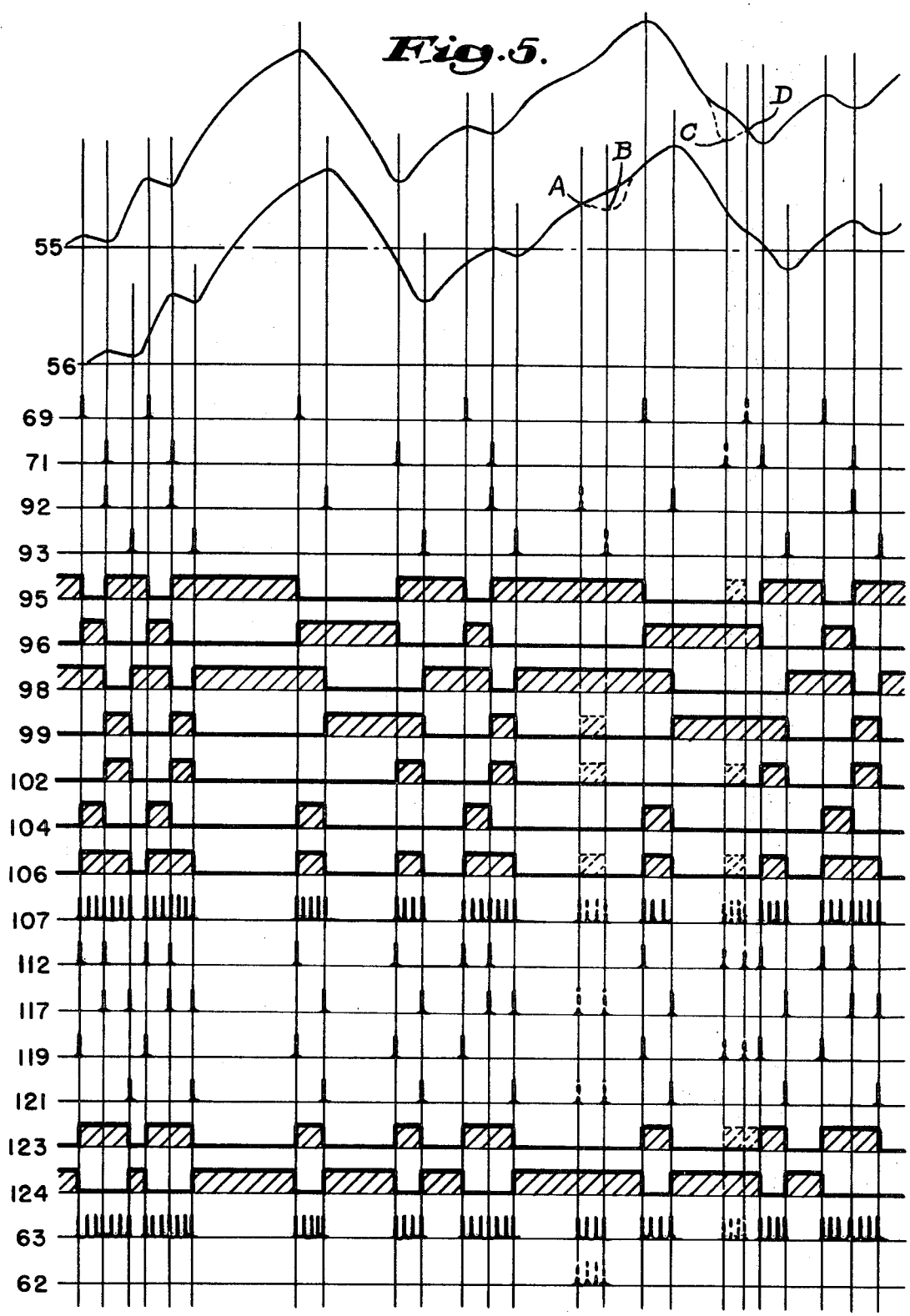

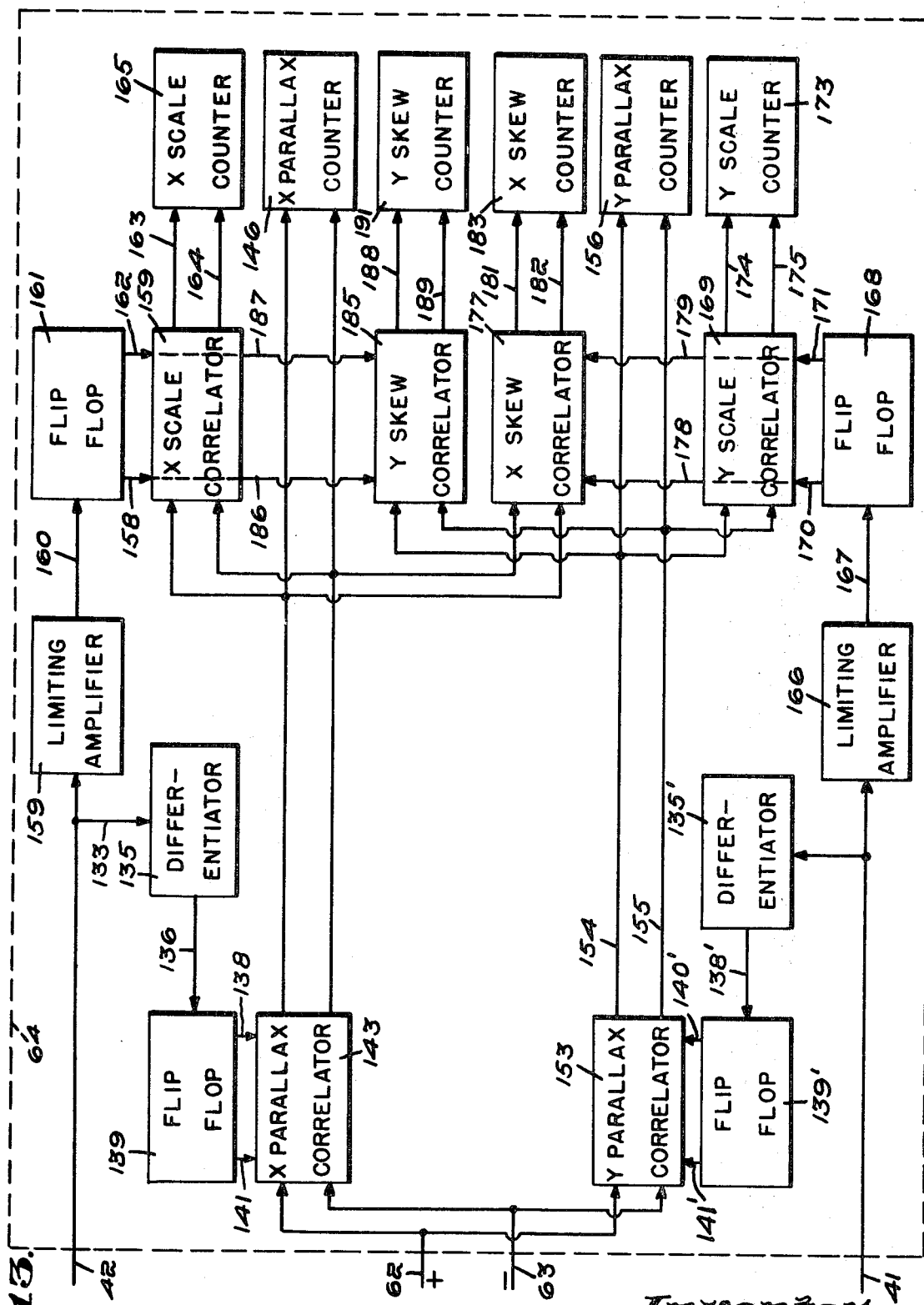

ABSTRACT OF THE DISCLOSURE

This disclosure relates to a technique and implementation thereof for the detection of the relative distortion between two patterns. The analog video signals, obtained by synchronously scanning the two patterns, are converted to binary waveforms where the binary level changes correspond to slope reversals of the respective analog signals. The binary signals are then compared and the intervals of disagreement noted and assigned a plus or minus sign, depending upon which of the two signals initiated the disagreement. The algebraic sum of the disagreement intervals is shown to be of a magnitude and sign as will indicate the amount and direction of the distortion differences.

BACKGROUND OF THE INVENTION

This invention relates generally to a method and apparatus for comparing and measuring the correspondence in detail between similar images and, more specifically, relates to an apparatus for measuring the degree of misregistration between stereo photographs.

Although not so limited, the present invention is particularly well suited for use in the production of topographic maps having contour lines representing points of equal elevation. Typically, maps of this type are obtained from stereoscopically related photographs taken from airplanes. When such photographs are accurately positioned in locations corresponding to the relative positions in which they were taken, their projection upon a suitable base can produce for an observer a three-dimensional presentation of the particular terrain imaged on the photographs.

Generally, because of practical flight photography limitations, the stereo photographs do not possess images of exactly corresponding surface areas. For this reason, a coherent stereo presentation is obtained only if the photographs are properly registered, i.e., so positioned that homologous areas in the two projections are aligned and have the same orientation. The problem of registration is accentuated by the fact that, typically, the image detail in the photographs is not identical in all respects. Detail nonuniformity is caused, for example, by photographing a given scene from the different camera viewpoints produced by variations in altitude, roll and pitch of the photographic aircraft. The resultant separation between corresponding points in the projected images is known as parallax. A rather detailed description of parallax and other types of higher order image detail misregistration which can exist in stereo photographs appears in U.S. Pat. No. 3,432,674, issued to Gilbert L. Hobrough on Mar. 11, 1969. Elimination of parallax requires intricate adjustment of the projected images relative to each other so as to establish exact registration of homologous image detail.

After attaining image registration, an observer is able to recognize points of equal elevation and to mark such points in the well known manner with continuous contour lines. However, recognition of parallax and its correction by manual registration techniques is a particularly slow and difficult operation requiring extreme concentration by highly skilled craftsman. In addition, the work periods of such craftsman must necessarily be short because of the intense visual fatigue resulting from the tedious operation.

Several rather complex systems have been devised to assist photogrammeters in performing the difficult tasks of image registration. Nevertheless, a continuing need has existed for improved equipment of this type.

The object of this invention, therefore, is to provide an improved instrument for comparing corresponding detail retained by related exhibits. A more specific object of this invention is to provide such an instrument specifically suited for use in measuring parallax existing between stereo photographs used in the field of photogrammetry.

CHARACTERIZATION OF THE INVENTION

One feature of this invention is the provision of a multiple display comparison instrument which generates first and second analog signals representing variable detail along a given path in a first exhibit and along a corresponding path in a second exhibit being compared with the first. The instrument compares the analog signals and establishes detail shift in the exhibits by determining disagreement intervals wherein the analog signals have slopes of opposite polarity. Comparison of the analog signal's slope polarities provides unique information regarding detail shift in compared exhibits.

Another feature of this invention is the provision of a multiple display comparison instrument of the above featured type including a discriminator which distinguishes disagreement interval portions which result from slope polarity reversals in the first analog signal from those disagreement interval portions which result from slope polarity reversals in the second analog signal. By separating the disagreement intervals into portions initiated by slope polarity reversals in each of the analog signals, one is able to determine the relative direction of existing detail shift.

Another feature of this invention is the provision of a multiple display comparison instrument of the above featured type including a device for measuring the difference between the combined lengths of the separated disagreement interval portions. This difference provides a measurement of the magnitude of relative detail shift in the exhibits.

Another feature of this invention is the provision of a multiple display comparison instrument of the above featured type which converts the analog signals into first and second binary signals having level changes corresponding to slope polarity reversals in the respective analog signals. The determination of the disagreement intervals is simplified by producing the easily compared binary signals. Furthermore, the conversion of the initially obtained analog signals into binary form renders the instrument particularly well suited for use with the conventional digital logic employed in commercial computer circuits.

Another feature of this invention is the provision of a multiple display comparison instrument of the above featured type including a pulse generating circuit which produces uniformly spaced addition output pulses during one of the disagreement interval portions and distinguishabe subtraction output pulses during the other disagreement interval portions. The separate addition and subtraction pulses represent in convenient digital form both the degree and sense of any detail shift existing in the compared exhibits.

Another feature of this invention is the provision of a multiple display comparison instrument of the above featured type including a parallax analyzer circuit which measures relative parallax existing between the compared exhibits by algebraically summing the addition and subtraction output pulses. This arrangement provides a completely digital representation of existing parallax.

Another feature of this invention is the provision of a multiple display comparison instrument of the above feature type wherein the first and second exhibits being compared comprise photographic images having homologous areas. This comparison of related photographic images is, of course, useful in the above mentioned photogrammetery field.

Another feature of this invention is the provision of a multiple display comparison instrument of the above feature type including a support for fixing the positions of the photographic images, scanner tubes for directing scanning beams through the photographic images and a raster generator for producing $x$ and $y$ scanning signals which develop identical crossed diagonal rasters for the scanner tubes. The scanning beams as modulated by the images are converted into the video analog signals by a video processor device and the crossed diagonal rasters provide desirable scanning spot travel paths in Cartesian coordinate type systems.

Another feature of this invention is the provision of a multiple display comparison instrument of the above featured type including an electrical circuit which produces an $x$ reference signal indicative of the slope of the $x$ scanning signal, and an $x$ parallax correlation circuit which reverses the signs of the addition and subtraction output pulses in response to $x$ scanning signal slope reversals indicated by the $x$ reference signal. The $x$ parallax correlation circuit eliminates polarity dependence of the parallax indicating digital output pulses upon the $x$ direction of scanning spot movement thereby producing a digital output which represents existing $x$ parallax.

Another feature of this invention is the provision of a multiple display comparison instrument of the above featured type including circuit means for producing a $y$ reference signal indicative of the slope of the $y$ scanning signal and a $y$ parallax correlation circuit which reverses the sign of the addition and subtraction pulses in response to a $y$ scanning signal slope reversal as indicated by the $y$ reference signal. The $y$ parallax correlation circuit eliminates polarity dependence of the parallax indicating output pulses upon the $y$ direction of scanning spot movement thereby producing a digital output which represents existing $y$ parallax.

Another feature of this invention is the provision of a multiple display comparison instrument of the above featured type including an $x$ polarity circuit producing one output signal in response to $x$ scanning signal values which direct scanning beams into the right halves of the scanner tubes and a different output signal in response to $x$ scanning values which direct scanning beams into the left halves of the scanner tube. The output of the $x$ polarity circuit is fed into an $x$ scale correlation circuit which reverses the sign of addition and subtraction output pulses received from the $x$ parallax correlation circuit in response to a change in the output signal received from the $x$ polarity circuit. By eliminating polarity dependence of the parallax indicating output pulses upon the position of the scanning spots relative to the rasters' $y$ axes, an accurate indication of existing $x$ scale distortion is obtained.

Another feature of this invention is the provision of a multiple display comparison instrument of the above featured type including a $y$ polarity circuit producing one output signal in response to $y$ scanning signal values which direct beams into the upper portions of the scanning tubes and a different output signal in response to $y$ scanning signal values which direct scanning beams into the lower portions of the scanning tubes. The output of the $y$ polarity circuit is fed into a $y$ scale correlation circuit which reverses the sign of addition and subtraction output pulses received from the $y$ parallax correlation circuit in response to changes in the output signal received from the $y$ polarity circuit. By eliminating polarity dependence of the parallax error indicating output pulses upon the position of the scanning spot relative to the rasters' $x$ axes, an accurate indication of existing $y$ scale distortion is obtained.

Another feature of this invention is the provision of a multiple display comparison instrument apparatus of the above featured types including an $x$ skew correlation circuit which reverses the sign of the addition and subtraction output pulses received from the $x$ parallax correlation circuit in response to changes in signal received from the $y$ polarity circuit. By eliminating polarity dependence of the $x$ parallax indicating output pulses upon the positions of the scanning spots relative to the rasters' $x$ axes, an accurate indication of existing $x$ skew distortion is obtained.

Another feature of this invention is the provision of a multiple display comparison instrument of the above featured types including a $y$ skew correlation circuit which reverses the sign of addition and subtraction output pulses received from the $y$ parallax correlation circuit in response to changes in the output signal received from the $x$ polarity circuit. By eliminating polarity dependence of the $y$ parallax indicating output pulses upon the positions of the scanning spots relative to the rasters' $y$ axes, an accurate indication of existing $y$ skew distortion is obtained.

Another feature of this invention is the provision of a multiple display comparison apparatus of the above featured types including digital pulse counters for obtaining the algebraic sums of the addition and subtraction output pulses received from each of the $x$ parallax correlator circuit, the $y$ parallax correlator circuit, the $x$ scale correlator circuit, the $y$ scale correlator circuit, the $x$ skew correlator circuit, and the $y$ skew correlator circuit. The individual counters furnish coherent digital measurements of each of the various types of detected distortion.

Another feature of this invention is the provision of a multiple display comparison instrument of the above featured type including a scanning spot control for varying the effective spot size produced by the scanning tubes. Controlled change of scanning spot size is an effective mechanism for varying the resolution of the instrument.

DESCRIPTION OF THE DRAWINGS

These and other object and features of the invention will become more apparent upon a perusal of the following specification taken in conjunction with the accompanying drawings wherein:

FIG. 2 is a block diagram of the parallax comparison system shown in FIG. 1;

FIG. 2a is a schematic circuit diagram of the peak-valley detectors shown in FIG. 2;

FIG. 3 is a chart showing the signal relationships in the parallax comparison system of FIG. 2;

FIG. 4 is a graph showing a plurality of waveforms representing one set of conditions in the parallax comparison system of FIG. 2;

FIG. 5 is a graph showing a plurality of waveforms representing another set of conditions in the parallax comparison system of FIG. 2;

FIGS. 8–11 are schematic representations of other forms of image parallax;

FIG. 12 is a diagrammatic view illustrating the character of spot travel in tracing crossed diagonal patterns;

FIG. 13 is a block diagram of the parallax analyzer system shown in FIG. 1;

DESCRIPTION OF THE PREFERRED EMBODIMENT

Figure 1:
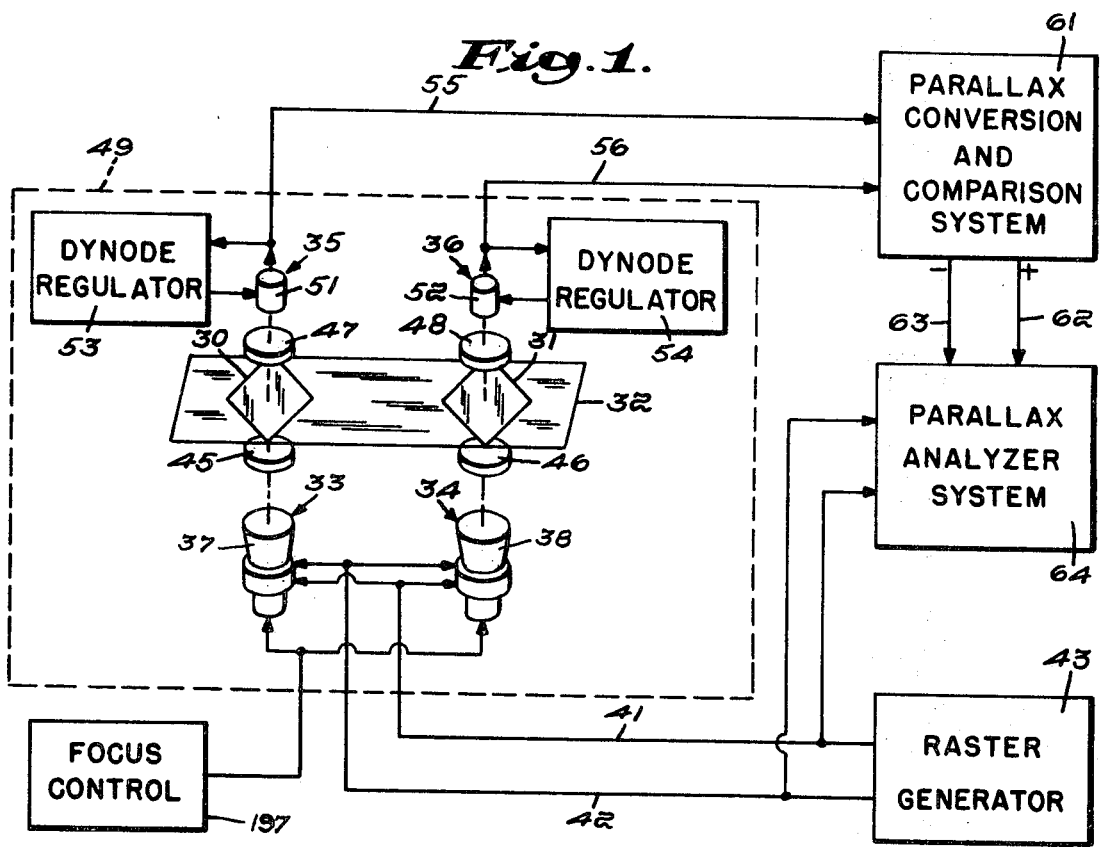
FIG. 1 is a general block diagram illustrating the functional interrelation of the main components of the apparatus.

For a general description of the invention, reference will be made to FIG. 1 wherein the transparent stereo photographs 30 and 31 are mounted on the transparent support table 32. Associated with the photographs 30 and 31 are the scanning assemblies 33 and 34 which direct scanning beams upwardly through the transparent photographs as diagrammatically indicated. The image modulated light energy of the scanning beams is collected by the pair of photoelectric detectors 35 and 36. Included in the scanning assemblies 33 and 34 are the scanning cathode ray tubes 37 and 38 having deflection systems connected by lines 41 and 42 to the raster generator 43 which produces the desired scanning rasters on the faces of the tubes 37 and 38.

The lens systems 45 and 46 focus the scanning beams received from the scanning tubes 37 and 38 onto the photographic transparencies 30 and 31. Similar lens systems 47 and 48 collect the light transmitted through the photographic transparencies 30 and 31 and redirect the light into the photoelectric detectors 35 and 36. Included in the photoelectric detectors 35 and 36 are the multiplier phototubes 51 and 52 which detect and amplify the light received from the lens systems 47 and 48 by the action of a series of dynodes or secondary emission stages. Associated with the multiplier phototubes 51 and 52 are the dynode regulators 53 and 54 which adjust automatically the amplification of each phototube in response to contemporary values of the output current thereof to maintain the average current output substantially constant.

During operation of the signal generator 49, the cathode ray tubes 37 and 38 under the influence of the raster generator 43 transmit scanning light beams toward the photoelectric detectors 47 and 48. Before reaching the multiplier phototubes 51 and 52, the light beams are image modulated by passage through the photographic transparencies 30 and 31. The anode current outputs of the phototubes 51 and 52 are at any instant dependent upon the amounts of light then incident thereon and such outputs appear on the signal lines 55 and 56. Thus, the signal generator 49 produces video analog signals which represent the scanned portions of the displays retained by the photographic transparencies 30 and 31. Details as to specific circuitry and mechanical structure suitable for use in the signal generator 49 appear in the above noted U.S. Pat. No. 3,432,674.

The video signals appearing on the signal lines 55 and 56 enter the parallax conversion and comparison system 61 which, described in greater detail below, converts the video analog signals into binary signals and compares these signals to determine phase displacement of the video input signals 55 and 56. Such displacement is indicative of parallax error existing between the photographic transparencies 30 and 31. The parallax conversion and comparison system 61 also determines the sense of any detected displacement and produces on the signal line 62 addition digital output pulses representing the degree to which the right video signal 56 leads the left video signal 55 and on the signal line 63 subtraction digital output pulses representing the degree to which the left video signal 55 leads the right video signal 56. The digital output pulses on the signal lines 62 and 63 enter the parallax analyzer system 64 which operates on the signals so as to determine both the extent and type of parallax existing between the photographic transparencies 30 and 31. Further details as to the operation of the parallax analyzer system 64 appear below.

Referring now to FIG. 2, there is shown a block schematic diagram of the parallax conversion and comparison system 61 shown in FIG. 1. The video analog signal on the signal line 55 is fed into the peak and valley detector circuit 65 which, as described more fully below, produces on the output line 69 a signal pulse in response to each positive to negative slope reversal in the video waveform on the signal line 55. The peak and valley detector 65 also produces on the output line 71 a signal pulse upon each negative to positive slope reversal in the video waveform on the signal line 55. Thus, signal pulses on the output line 71 represent valleys in the video waveform on line 55 and signal pulses on output line 69 represent peaks.

A circuit diagram of the peak and valley detector 65 is shown in FIG. 2a. Connecting the signal line 55 to the emitter electrode of the transistor 72 is the amplifier 73. The base electrode of the transistor 72 is coupled to its emitter electrode by the diode 74 and to ground by the capacitor 75. Connected between the collector electrode of the transistor 72 and the negative terminal 76 is the load resistor 77. The capacitor 78 is connected to the signal line 71 by the differentiator circuit including the diode 79 and grounded resistor 80 and to the signal line 69 by the differentiator circuit including the diode 81, grounded resistor 82 and inverter 83.

During periods when the amplifier 73 output is decreasing, the diode 74 conducts discharging the capacitor 75 and preventing conduction by the transistor 72. However, during periods when the amplifier 73 output is increasing, the transistor 72 conducts to saturation recharging the capacitor 75. The voltage on the collector electrode of the transistor 72 forms a square wave having negative to positive transitions corresponding to negative to positive slope reversals (valleys) in the video signal 55 and positive to negative transitions corresponding to positive to negative slope reversals (peaks) therein. Negative to positive transitions in this collector electrode voltage induce instantaneous current flow through the diode 79 and resistor 80 producing positive voltage pulses on the signal line 71. Conversely, positive to negative transitions in collector electrode voltage induce instantaneous current flow through the diode 81 and resistor 82 producing inverted positive voltage pulses on the signal line 69.

Similarly, the peak detector 86 which is identical to that shown in FIG. 2a produces a positive pulse on the signal line 92 in response to a positive to negative slope reversal in the video signal appearing on the signal line 56 and a positive pulse on the signal line 93 in response to a negative to positive slope reversal in the video signal. Therefore, output pulses appearing on the signal line 92 represent peaks in the video waveform 56 while output pulses on the signal line 93 represent valleys therein.

The pulses on the signal lines 69 and 71 enter the flip-flop circuit 94 which produces on the signal line 95 a binary signal having a positive value after reception of a peak pulse from signal line 69 and a zero value after reception of a valley pulse from signal line 71. In addition, the flip-flop 94 produces on the signal line 96 a complementary binary signal having a positive value when the signal on line 95 is zero and a zero value when the signal on the line 95 is positive. In the same way the output pulses on the signal lines 92 and 93 enter the flip-flop 97 which produces on the signal line 98 a binary signal having a positive value after reception of a peak pulse from the signal line 92 and a zero value after reception of a valley pulse from the signal line 93. The flip-flop 97 also produces on the signal line 99 a complementary binary signal having a positive value when the signal on the signal line 98 is zero and a zero value when that signal is positive.

The binary signals on the lines 95 and 99 are combined in the And gate circuit 101 which produces on the signal line 102 a positive signal only upon the occurrence of positive signals on both the sigal lines 95 and 99. Similarly, the binary signals on the signal lines 96 and 98 are combined in the And gate circuit 103 which produces on the signal line 104 a positive signal only upon the occurrence of positive signals on both signal lines 96 and 98. Signal lines 102 and 104 are coupled into the Or gate circuit 105 which produces on the signal line 106 a binary signal having a positive value when either of the input signals from the signal lines 102 and 104 is positive and a zero output when voltages on both lines 102 and 104 are zero.

The relationships existing between the above mentioned binary signals are illustrated in FIG. 3 wherein corresponding signal values for the various signal lines are tabulated vertically. An examination of FIG. 3 shows that the Or gate 105 produces on the signal line 106 a positive output signal when the signal values on lines 95 and 98 disagree and a zero output signal when the signal values on lines 95 and 98 agree. However, as described above, the binary signal on line 95 has positive and zero values dependent upon the slope of the video signal on the line 55 and the binary signal on line 98 has positive and zero values dependent upon the slope of the video signal on the line 56. Therefore, the comparison circuit 61 produces a signal on output line 106 that detects the slope polarity relationship existing between the video waveforms on the signal lines 55 and 56. For example, when the slopes of the video waveforms on the signal lines 55 and 56 are either both positive or both negative, the signal on line 106 will have a zero value but when one of the video waveforms slopes is positive and the other negative the signal on line 106 will possess a positive value.

Digital output pulses representing increments of disagreement in video waveform slope polarity appear on the output line 107 of the And gate circuit 108. The And gate 108 receives the signal on the line 106 and sampling pulses produced on line 109 by the pulse generator 110 and transmits the received sampling pulses onto the output line 107 only when the signal on line 106 has a positive value.

In describing the operation of the parallax conversion and comparison system 61, one can first consider the hypothetical situation wherein the signal generator 49 produces on the lines 55 and 56 signals having identical waveforms. Such a condition would exist if the scanning beams produced by the cathode ray tubes 37 and 38 were passing simultaneously through exactly homologous regions in the photographic transparencies 30 and 31. A hypothetical waveform representing identical video signals on lines 55 and 56 and the various waveforms generated thereby in the parallax conversion and comparison system 61 are illustrated in FIG. 4. As shown, simultaneous positive signals never occur on either the signal lines 95 and 99 or on the signal lines 96 and 98. Therefore, the outputs of the And gates 101 and 103 and of the Or gate 105 remain zero. Accordingly, the And gate 108 fails to transmit to the signal line 107 any of the sampling pulses on the signal line 109. This zero output indicates the absence of image detail misregistration or parallax between the photographic transparencies 30 and 31 and is a correct indication for the assumed conditions of perfect registration.

Figure 5A:
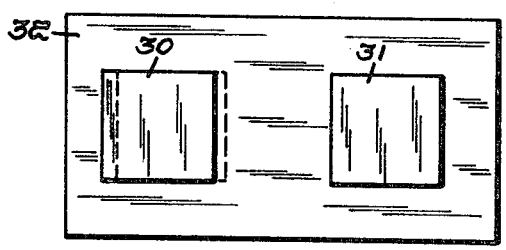
FIG. 5a is a schematic representation of a form of parallax relating to the waveforms in FIG. 5.

Referring now to FIG. 5, there are illustrated resultant video waveforms under a condition wherein exact registration does not exist between the scanned areas of the photographic transparencies 30 and 31. As shown, the video waveform on the left signal line 55 is shifted slightly to the left with respect to the identical video waveform on the signal line 56. This condition would exist, for example, if as shown in FIG. 5a the left transparency 30 were shifted to the left of the position (shown dotted) which produced the above described perfect registration with the transparency 31. The output waveforms generated on the various signal lines of the parallax comparison system 61 by the phase shifted video inputs are shown with solid lines in FIG. 5. The periods along the time axis wherein slopes of opposite polarity exist in the video waveforms 55 and 56 result in corresponding periods wherein either the signals on the signal lines 95 and 99 or those on the signal lines 96 and 98 are simultaneously positive. These periods produce on the signal lines 102 and 104 the illustrated positive signal value periods which combine on the signal line 106 and open And gate 108 permitting transmission of digital pulses on the signal line 107.

Figure 7:
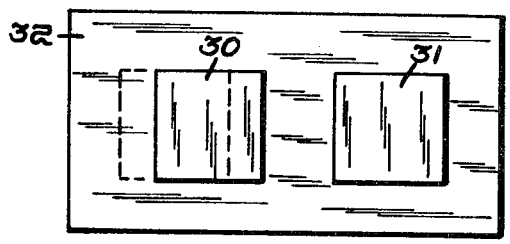
FIG. 7 is a schematic representation of a form of parallax relating to the waveforms in FIG. 6.
Figure 6:
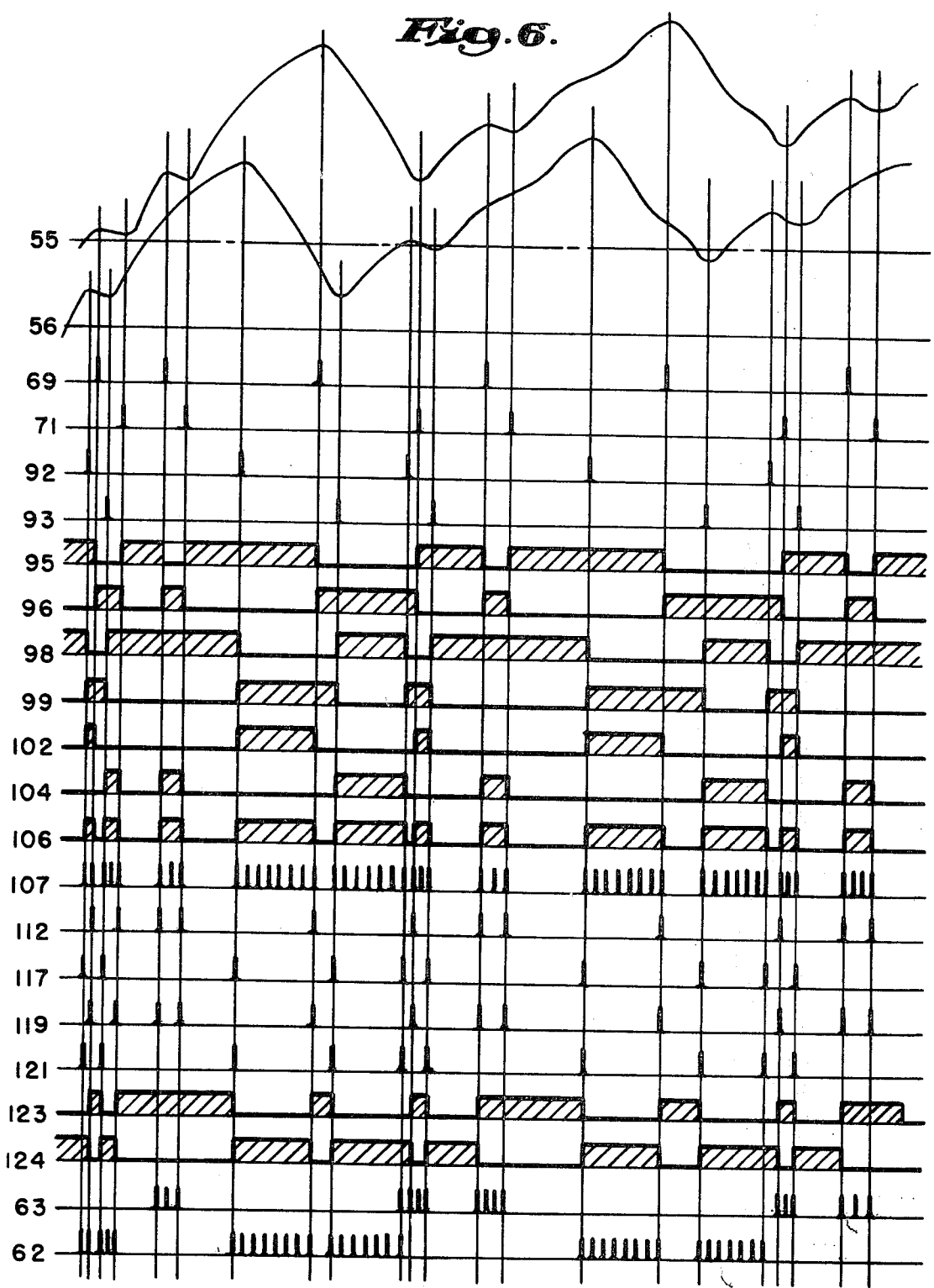
FIG. 6 is a graph showing a plurality of waveforms representing another set of conditions in the comparison system of FIG. 2.

The presence of digital pulses on the signal line 107 not only indicates the existence of parallax between the photographic transparencies 30 and 31 but the number of such pulses denotes the magnitude of the parallax. This fact is illustrated in FIG. 6 wherein the waveform representing the video signal on line 55 again has been phase shifted with respect to that appearing on the signal lines 56. However, the shift is opposite in direction and of substantially greater magnitude than that shown in FIG. 5. This condition in the video signals would exist, for example, if as shown in FIG. 7 the left transparency 30 were shifted to the right of the position (shown dotted) which produced registration with the transparency 31 and if the shift distance were greater than that shown in FIG. 5a. As above, the periods along the time axis wherein the video waveforms have opposite slopes result in corresponding positive signal periods on either the line 102 or the line 104. These signal periods are combined in the signal line 106 and open the And gate 108 to produce digital output pulses on the signal line 107. It will be noted that the larger phase shift illustrated in FIG. 6 with respect to that in FIG. 5 is accompanied by a correspondingly larger number of output pulses on the signal line 107.

Although the digital output on the signal line 107 is indicative of both the existence and the magnitude of parallaxes between the photographic transparencies 30 and 31 as represented by the phase shifts between the corresponding waveforms on the signal lines 55 and 56, the output does not identify the direction of shifts which in the illustrated examples of FIGS. 5 and 6 were in opposite directions. Naturally, a determination of the direction of shift is required before any type of corrective action can be taken.

In describing how the present invention determines the direction of existing parallax, reference again is made to FIG. 2. Connected to the signal lines 69 and 71 is the Or gate 111 which receives peak and valley pulses from the peak detector 65 and transmits them over signal line 112 to the Inhibit gate 113 and over signal line 114 to the Inhibit gate 115. Similarly, connected to the signal lines 92 and 93 is the Or gate 116 which receives peak and valley pulses from the peak detector 86 and transmits them over signal line 117 to the Inhibit gate 115 and over signal line 118 to the Inhibit gate 113.

The Inhibit gate 113 passes each pulse received on line 112 to the output signal line 119 unless a simultaneous inhibiting pulse is received on the signal line 118. Similarly, the Inhibit gate 115 passes onto output signal line 121 each pulse received from signal line 117 unless a simultaneous inhibiting pulse is received from signal in line 114. Thus, the flip-flop circuit 122 receives all peak and valley pulses produced by the peak detector 65 except those inhibited by simultaneous pulses from the peak detector 86, and receives all peak and valley pulses from the peak detector 86 except those inhibited by simultaneous pulses from the peak detector 65. The output of the flip-flop circuit 122 on signal line 123 is a binary signal having a positive value after reception of a pulse on the signal line 119 and a zero value after reception of a pulse on the signal line 121. Also produced by the flip-flop circuit 122 on the signal line 124 is a complementary binary signal having a positive value when the signal on line 123 is zero and a zero value when the signal on line 123 is positive.

The output voltages from the flip-flop 122 function as control signals for the And gates 125 and 126 each connected to the And gate 108 by the signal line 107. Only during periods of positive voltage on the signal line 123 is the And gate 125 open and effective to transmit digital pulses from the signal line 107 to the output line 63. In the same way, only during periods of positive voltage on control line 124 is the And gate 126 open and effective to transmit digital pulses from the line 107 to the output line 62.

The manner in which the above described circuit elements establish the sense of the parallax represented by the digital output on the signal line 107 will be explained by referring again to the waveforms shown in FIGS. 5 and 6. As shown in FIG. 5, each period of slope polarity disagreement between the waveforms 55 and 56 is represented by a corresponding period of positive voltage on the signal line 106 and by the resultant digital output pulses on the signal line 107. An examination of the waveforms reveals that each of these periods is initiated by a slop reversal in the leading video waveform on the signal line 55. The pulses on the signal line 119 representing these slope reversals produce on the output line 123 of the flip-flop 122 positive voltage periods which correspond in time with the output pulses on the signal line 107. Accordingly, all of the output pulses on the signal line 107 are transmitted by the open And gate 125 to the output line 63. Thus, the presence of digital pulses on the signal line 63, which can be arbitrarily designated the subtraction output line, denotes that the video signal on line 55 is leading the signal on line 56. This in turn means that correction of the parallax causing the video signal phase shift requires displacement of the scanned image on the transparency 30 to the right relative to that on the transparency 31.

Conversely, in the example of FIG. 6, a very high percentage of the slope polarity disagreement periods between the waveforms 55 and 56 are initiated by slope reversals in the waveform appearing on the signal line 56. The pulses representing these reversals on signal line 121 produce on the output line 124 of flip-flop 122 positive voltage periods which correspond in time with most of the parallax indicating digital pulses on the signal line 107. Accordingly, those output pulses are transmitted by the open And gate 126 onto the line 62 which can be arbitrarily designated the addition output line. Although the relatively large video signal phase shift illustrated in FIG. 6 produces some digital output pulses on both output lines 62 and 63, the overwhelming preponderance of these pulses appears on the addition output line 62 denoting that the video signal on line 55 lags that on line 56. This also means that correction of the parallax causing the video signal phase shift requires displacement of the scanned image on the transparency 30 to the left relative to that on the transparency 31.

Thus, the difference between the numbers of pulses appearing on the addition output line 62 and the subtraction output line 63 indicates the magnitude of composite phase shift existing between the video signals on the signal lines 55 and 56 and, accordingly, of the composite parallax existing between the scanned images on the photographic transparencies 30 and 31. Furthermore, the polarity of the algebraic summation signifies the sense of the parallax with a positive summation denoting parallax error in one direction and a negative summation denoting parallax error in the opposite direction.

The above description was based on the assumptions that the photographic transparencies 30 and 31 would generate identical video analog signals on the signal lines 55 and 56 and that these signals would produce absolutely uniform and predictable waveforms in the parallax conversion and comparison system 61. Although such conditions cannot be expected normally, the sensitivity of the present invention is not greatly affected either by circuit noise or by photographic nonuniformities in the transparencies 30 and 31. For example, although noise on the video analog signals 55 and 56 may slightly shift the position of a slope reversal, noise will not alter its sense. Therefore, in most instances, noise will merely introduce minor changes in the lengths of the pulse transmission periods on the signal line 107 rather than creating or eliminating such periods. Furthermore, random noise effects will tend to be compensatory with slightly lengthened pulse periods cancelling slightly shortened ones.

Additional noise compensation is obtained during the algebraic summation of the digital outputs on addition and subtraction lines 62 and 63. This is illustrated in FIG. 5 wherein the dotted pulses on the signal lines 69, 71, 92 and 93 represent noise. These pulses could be caused, for example, either by circuit noise or by actual slope reversals occurring exclusively on video signal 56 at points A and B and exclusively on video signal 55 at points C and D because of nonuniformities in the transparencies 30 and 31 themselves. Such nonuniformities can result from slightly inconsistent handling during either the manufacturing or processing of the individual films. It will be noted in following the dotted waveforms generated by the noise, that while two additional output pulse periods are produced on the signal line 107, the periods are separated on the addition and subtraction output signal lines 62 and 63. Thus, upon an algebraic summation of the outputs, the noise represented by these pulses would be cancelled.

As described above, the parallax conversion and comparison system 61 delivers on the lines 62 and 63 output pulses having characteristics dependent upon the relative timing between the video input signals on the lines 55 and 56. In particular, if the video signal on line 55 is lagging the video signal on line 56, the predominant digital output will appear on the addition output line 62. Conversely, if the video signal on the line 55 is leading the signal on line 76, the predominant digital output will appear on the subtraction output line 63. However, the sense of any video analog signal shift introduced by a given parallax error can be dependent upon both the position and velocity of the scanning spots on the faces of the cathode ray tubes 37 and 38. An example of this fact is clearly indicated by considering the simple displacement induced parallax illustrated in FIG. 7. As shown, the identical photographic transparencies 30 and 31 are so positioned on support table 32 that the left transparency 30 is shifted to the right of the dotted position which would produce identical in-phase video signals on the lines 55 and 56. As the scanning spots provided by the cathode ray tubes 37 and 38 are travelling from left to right in FIG. 7, it will be obvious that the modulated video signal produced by the left transparency 30 on the signal line 55 will lag that produced by the right transparency 31 on the signal line 56 and that the predominant digital output will appear on the addition output line 62. However, assuming scanning spot velocities from right to left in FIG. 7, the video signal produced by the left transparency 30 on the signal line 55 will lead that produced by the right transparency 31 on the signal line 56 and the predominant digital output will appear on the subtraction output line 63. Thus, a given parallax existing between the photographic transparencies can produce digital outputs of opposite sense from the parallax conversion and comparison system 61 depending upon the direction of scanning spot travel. It will be obvious that a similar relationship exists between parallax caused by upward or downward shifts of the transparencies and up and down scanning spot velocities.

FIG. 8 illustrates a form of parallax that would produce a digital output dependent on the relative positions of the scanning spots as well as their velocities. As shown, an image 128 retained by the left transparency is expanded to both the right and left of the boundaries (shown dotted) required to produce registration with the corresponding image 129 in the right transparency. For spot travel from left to right and through the left half of the image 128, it will produce a leading video signal. However, during spot travel in the same left to right direction but through the right half of the image 128, it will produce a lagging video signal. Thus, the same parallax will produce opposite outputs depending upon horizontal direction of spot movement and upon which vertical half of the image is being scanned. Parallax caused by image expansion in a vertical direction (FIG. 9) produces video signal shifts exhibiting a similar dependence upon vertical direction of spot movement and upon which horizontal half of the image is being scanned.

FIG. 10 illustrates another form of parallax having a different relationship to scanning spot movement and location. As shown, the upper half of the image 130 retained by the left transparency is shifted to the right and the lower half is shifted to the left with respect to boundaries (shown dotted) required for registration with the image 131 on the right transparency. Scanning spot movement from left to right in the upper half of the image 130 will produce a lagging video signal while movement in the same direction in the bottom half of the image will produce a leading signal. Conversely, spot movement from right to left in the upper half of image 130 will produce a leading signal while the same direction of spot movement in the lower half will produce a lagging signal. Thus, the parallax illustrated in FIG. 10 produces video signal shifts which depend upon the horizontal direction of spot movement and upon which horizontal half of the image is being scanned. Parallax caused by the image shifts shown in FIG. 11 produces video signal shifts exhibiting a similar dependence upon vertical direction of spot movement and upon which vertical half of the image is being scanned.

Because of the above noted output ambiguities, obtaining a coherent measurement of actual parallax requires that the output of the parallax conversion and comparison system 61 be correlated with both the location and velocity of the scanning spot. This correlation occurs in the parallax analyzer system 64 as described in detail below.

The coordinate positions of the scanning spots on the rasters on the cathode ray scanning tubes 37 and 38 are at any instant substantially linear functions of their $x$ and $y$ deflection coil currents. Therefore, $x$ and $y$ reference signals supplied on the lines 41 and 42 respectively represent the instantaneous positions of the scanning spots in coordinate systems having their origins at the centers of the rasters. Consequently, the sign and amplitude of the $x$-reference signal on the input line 42 determines the positions of the scanning spots within the rasters in the $x$-coordinate direction. Correspondingly, the sign and amplitude of the $y$-reference signal on the input line 41 determines the positions of the scanning spots within the rasters in the $y$-coordinate direction. These factors are utilized in the parallax analyzer system 64 wherein the composite parallax error signals on the lines 62 and 63 are correlated with the $x$ and $y$ reference signals on the lines 41 and 42 so as to obtain coherent digital measurements of the different types of distortion existing between the photographic transparencies 30 and 31.

In accordance with the invention, a crossed diagonal, or Lissajous, raster pattern as shown in FIG. 12 is preferred for use on the faces of the tubes 37 and 38. The advantage of the cross diagonal scan is that the slopes of scanning spot velocities are always plus or minus unity so that correlation for velocity can consist of merely inverting the sense of the composite signals on lines 62 and 63 in response to slope reversals in the reference signals on lines 41 and 42. Suitable circuits for generating the raster pattern shown in FIG. 12 are shown and described in the above referenced U.S. Pat. No. 3,432,674. Also in that patent, various forms of distortion are given descriptive designations based on their relationship to the assumed coordinate system. Thus, mere relative shift between the transparencies in the horizontal direction (FIG. 7) is identified as simple $x$ parallax while corresponding shift in the vertical direction is simple $y$ parallax. Similarly, differences in the transparencies as to retained image scale in the horizontal direction (FIG. 8) is identified as $x$ scale distortion and corresponding mismatch in the vertical direction (FIG. 9) is $y$ scale distortion. Also, relative horizontal shift error having an opposite sense in different horizontal halves of the transparencies (FIG. 10) is identified as $x$ skew distortion and the corresponding mis-registration in the vertical direction (FIG. 11) is $y$ skew error. Although, for purposes of simplicity, each of the above illustrations suggests image deformation of the left transparency with respect to the right, it will be appreciated that distortion is merely the failure of corresponding points in similar, superimposed images to coincide and can result from relative image content shift in either or both of the transparencies.

A description of the correlation process will be made in connection with FIG. 13 which is a schematic block diagram of the parallax analyzer system 64. The $x$ reference signal on the line 42 is received by the differentiator circuit 135 on line 133. The differentiator 135 produces on line 136 a positive voltage when the value of the $x$ reference signal value is increasing and a negative voltage when it is decreasing. Connected to the differentiator 135 is the flip-flop circuit 139 which produces a binary signal on line 138 having positive and zero levels corresponding respectively to positive and negative voltages on line 136. The flip-flop 139 also produces a binary signal on line 141 which is complementary to that on signal line 140, i.e., positive when line 140 is zero and zero when line 140 is positive. Waveforms illustrating the relationships between signals on lines 42, 136, 138 and 141 are tabulated in FIG. 14.

The $x$ parallax reference signals received on lines 138 and 141 are correlated with the composite parallax error signals on the lines 62 and 63 in the $x$ parallax correlator 143. The output of the $x$ parallax correlator 143, as described more fully below, comprises digital pulses on the addition signal line 144 representing $x$ parallax in one sense and digital pulses on the subtraction signal line 145 representing $x$ parallax in the opposite sense. These signals are algebraically summed in the $x$ parallax add-subtract counter 146 to provide a coherent measurement of actual $x$ parallax existing between the photographic transparencies 30 and 31.

Figure 15:
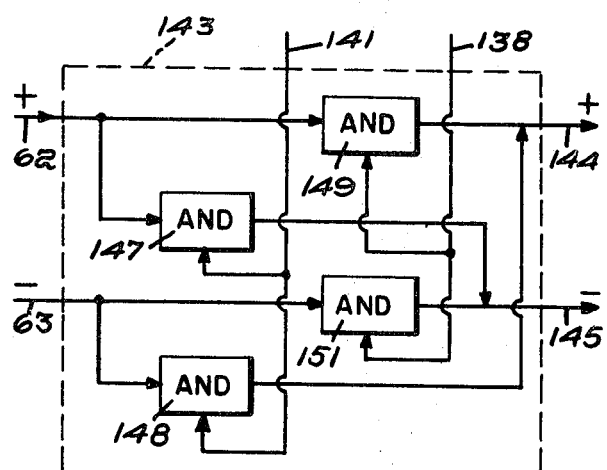
FIG. 15 is a block diagram of one of the correlators shown in FIG. 13.

Referring now to FIG. 15, there is shown a more detailed block circuit diagram of the $x$ parallax correlator 143 included in FIG. 13. The And gate 147 receives input signals from signal lines 62 and 141 and produces output signals on the signal line 145. The corresponding And gate 148 receives input signals from the lines 63 and 141 and produces output signals on the line 144. Also included in the correlator 143 are the And gate 149 which receives signals from the lines 62 and 138 and produces an output on signal line 144; and the corresponding And gate 151 which receives inputs from the lines 63 and 138 and produces an output on the signal line 145.

In operation, addition pulses on signal line 62 are transmitted directly to addition output line 144 by the And gate 149 when opened by a positive voltage on signal line 138. Conversely, addition pulses on the signal line 62 are diverted onto the subtraction output line 145 by the And gate 147 when opened by a positive voltage on signal line 141. Similarly, subtraction pulses on signal line 63 are transmitted directly to subtraction output line 145 by the And gate 151 when opened by a positive voltage on signal line 138 but are diverted onto addition output line 144 by the And gate 148 when opened by a positive voltage on the signal line 141.

Figure 14:
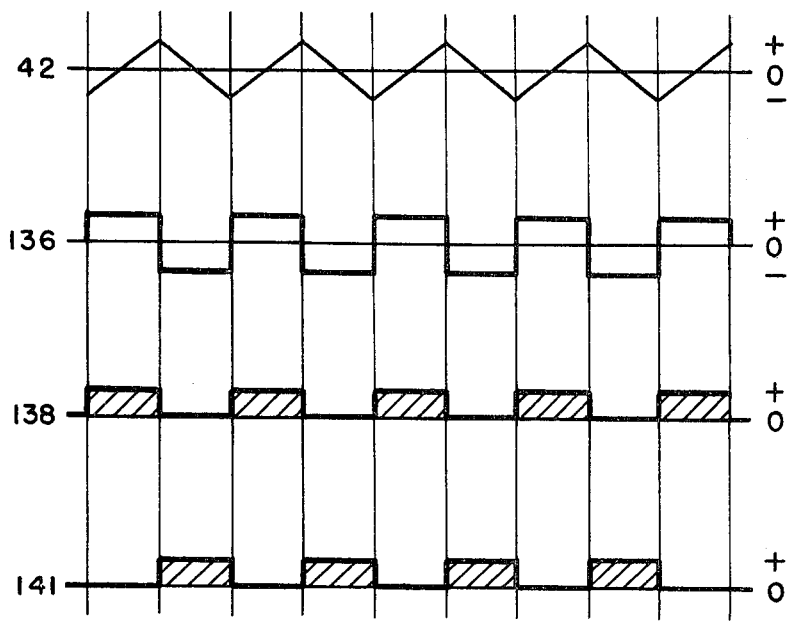
FIG. 14 is a graph showing waveforms in the parallax analyzer system of FIG. 13.

Referring now to FIG. 14, it will be noted that during periods of positive *x* reference signal slope on lines 42, which correspond to scanning spot movement from left to right, the voltage on line 138 is positive and that on line 141 is zero. Conversely, during periods of negative *x* reference signal slope, which correspond to scanning spot movement from right to left, the voltage on line 138 is zero and voltage on line 141 is positive. Therefore, during periods when the scanning spots are moving with a positive *x* velocity from left to right, the positive voltage on signal line 138 will open And gates 149 and 151 causing direct transmittal of the digital pulses on addition line 62 and subtraction line 63 onto the corresponding output lines 144 and 145. However, during periods when the scanning spots are moving with a negative *x* velocity from right to left, the positive voltage on line 141 will open And gates 147 and 148 causing transfer of the pulses on signal lines 62 and 63 onto output lines 144 and 145 of opposite polarity. Because of this correlative action in the *x* parallax correlator 143, the digital output on each of the signal lines 144 and 145 is independent of the *x* direction of scanning spot movement and the algebraic summation obtained in the *x* parallax counter 146 is a coherent measurement of actual *x* parallax existing between the photographic transparencies being compared. A reference to the simple *x* parallax shown in FIG. 7 will illustrate the corrective action of the *x* parallax correlator 143. During scanning spot movement from left to right, the video signal on line 55 will lag that on line 56 and a digital output will appear on addition output line 62. The positive voltage on line 138 resulting from the positive *x* direction of spot travel will open And gate 149 allowing direct transmission of the pulses onto the addition output line 144. Conversely, during scanning spot movement from right to left, the video signal on line 55 will lead that on line 56 and a digital output will appear on subtraction output line 63. The positive voltage on line 141 resulting from the negative *x* direction of spot travel will open And gate 148 causing transfer of the pulses from subtraction line 63 to the addition output line 144. Thus, the entire digital output will appear on addition output line 144 regardless of the *x* direction of scanning spot movement.

Returning again to FIG. 13, the parallax analyzer system 64 determines *y* parallax with circuits similar to those used to determine *x* parallax. The differentiator 135' receives the *y* reference signal on the line 41 and provides on line 138' a control signal for the flip-flop circuit 139'. The operation of the differentiator 135' and the flip-flop 139' is identical to that described above in connection with the *x* parallax correlator 143 except that the circuits are responsive to the *y* reference signal rather than to the *x* reference signal. Thus, the flip-flop 139' produce a positive voltage on the signal line 140' and a zero voltage on line 141' when the differentiator output on line 138' is positive. This denotes a period of positive *y* reference signal slop corresponding to an up direction of scanning spot movement. Conversely, the flip-flop 139' produces a zero voltage on line 140' and a positive voltage on the line 141' in response to negative voltage on line 138' denoting periods of negative *y* reference signal slope which correspond to scanning spot movement in a down direction.

The signals on lines 140' and 141' are correlated with the composite parallax error signals on line 62 and 63 in the parallax correlator 153 which is identical to the *x* correlator shown in FIG. 15. Therefore, when the scanning spots move in a positive *y* direction, the *y* parallax correlator 153 transmits digital pulses on the addition input line 62 directly onto the addition output line 154 and transmits digital pulses on the subtraction input line 63 directly onto the subtraction output line 155. However, when scanning spots are moving in the opposite or negative *y* direction, the *y* parallax correlator 153 transfers the digital pulses on the subtraction input line 63 onto the addition output line 154 and transfers the pulses on the addition input line 62 onto the subtraction output line 155. Accordingly, the digital output appearing on each of the output lines 154 and 155 is independent of the *y* direction of scanning spot movement thereby enabling the *y* parallax add-subtract counter 156 to provide a coherent measurement of actual *y* parallax existing between the compared transparencies.

For determining *x* scale distortion, the *x* reference signal on line 42 is fed into the limiting amplifier 157 having a binary output on the line 160 which is positive when the *x* reference signal is positive and zero when the *x* reference signal is negative. Thus, the signal on line 160 is positive during scanning spot movement in the first and second quadrants of the raster coordinate systems and is zero during scanning spot movement in the third and fourth quadrants thereof. This signal is received by flip-flop circuit 161 which produces an identical signal on line 158. The flip-flop 161 also produces a complement of the signal on line 162. Waveforms illustrating the relationships between the signals on lines 42, 158, 160 and 162 are tabulated in FIG. 16.

Figure 16:
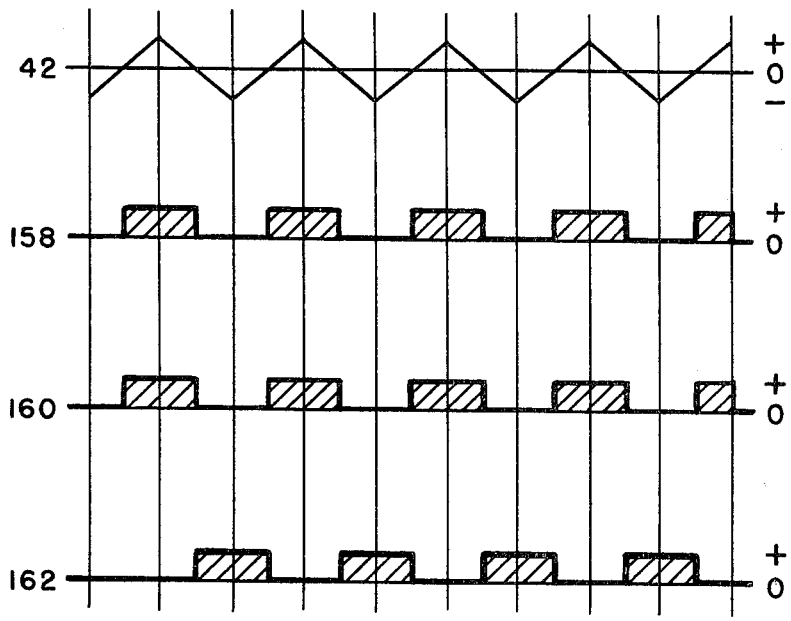
FIG. 16 is a graph showing other waveforms for the parallax analyzer system of FIG. 13.

The *x* scale reference signals on lines 158 and 162 are correlated with the *x* parallax signals on lines 144 and 145 in the *x* scale correlator 159 which is identical to the *x* parallax correlator shown shown in FIG. 15. Thus, the *x* scale correlator 158 directly transmits pulses on the addition input line 144 to the addition output line 163 and pulses on subtraction input line 145 to the subtraction output line 164 when the voltage on signal line 158 is positive. As shown in FIG. 16, this corresponds to periods in which the *x* reference signal is positive meaning that the scanning spots are in the right halves of the rasters. Conversely, the *x* scale correlator 159 transfers pulses from addition input line 144 to subtraction output line 164 and pulses from subtraction input line 145 to addition output line 163 when a positive voltage is present on signal line 162. This denotes a negative *x* reference signal and corresponds to periods wherein the scanning spots are in the left halves of the rasters.

Because of the correlative action produced in the *x* scale correlator 159 the algebraic summation of the pulses on lines 163 and 164 obtained in the *x* scale add-subtract counter 165 is directly proportional to *x* scale distortion existing between the transparencies being compared. This is clearly shown by referring to the example of *x* scale distortion illustrated in FIG. 8. During positive *x* scanning spot movement in the left half of the raster, the video signal produced by left image 128 will lead that produced by right image 129 and an output will appear on subtraction output line 63. Because of the positive *x* direction of spot travel, this output will be transmitted by the *x* parallax correlator 143 directly onto subtraction ouput line 145. However, the positive voltage on signal line 162 representing a negative *x* reference signal value will cause the *x* scale correlator to transfer the output from subtraction line 145 to *addition line 163*. During positive *x* scanning spot movement in the right half of the raster, the video signal generated by left image 128 will lag and an output will appear on addition output line 62. Again because of the positive *x* direction of spot travel, the *x* parallax correlator 143 will transmit this output directly to addition line 144. Responsive to the positive *x* reference signal value, the *x* scale correlator 159 also will transmit the output on addition line 144 directly to *addition line 163*. During negative *x* scanning spot movement in the right half of the raster, the video signal generated by left image 128 again will lead that produced by right image 129 and an output will appear on subtraction line 63. This output will be transferred first to addition line 144 by the *x* parallax correlator 143 because of the negative *x* direction of spot travel and transmitted directly to *addition line 163* by *x* scale correlator 159 because of the positive *x* reference signal value. Finally, during negative *x* scanning spot movement in the left half of the raster, the video signal generated by the left image 128 again will lag and an output will appear on addition line 62. This output will be transferred to subtraction line 145 by the *x* parallax correlator 143 because of the negative *x* direction of spot travel but will be retransferred to *addition line 163* by the *x* scale correlator 159 because of the negative *x* reference signal value. Thus, regardless of position and velocity of the scanning spots, all digital pulses generated on composite parallax lines 62 and 63 by the *x* scale parallax shown in FIG. 8 ultimately will appear upon the same addition input line 163. Obviously, the *x* scale correlator 159 will function in an exactly reciprocal manner to produce a digital output on subtraction output line 164 when the sense of *x* scale parallax is opposite to that shown in FIG. 8. For this reason, the *x* scale counter 165 measures both magnitude and sense of the existing *x* scale distortion.

Returning again to FIG. 13, the *y* reference signal on the signal line 41 is fed into the limiting amplifier 166 which provides an input on line 167 for the flip-flop circuit 168. The *y* scale correlator 169 is controlled by the flip-flop 168 which produces on line 170 a signal identical to that on line 167. The flip-flop circuit 168 also produces a signal on line 171 which is the complement thereto. The operation and function of the limiting amplifier 166, the flip-flop circuit 168 and the *y* scale correlator 169 with respect to the *y* reference signal on line 41 are directly analogous to that described above for the limiting amplifier 157, the flip-flop 161 and the *x* scale correlator 159 with respect to the *x* reference signal on signal line 42.

It will be apparent from the foregoing discussion concerning the operation of the *x* scale correlator 159 with respect to the *x* scale distortion shown in FIG. 8 that the *y* scale correlator 169 will function in an entirely analogous manner with respect to the *y* scale distortion shown in FIG. 9. Accordingly, a specific description of that operation has been omitted as unnecessary for a complete understanding of why an algebraic summation by the *y* scale add-subtract counter 173 of output pulses present on the addition output line 174 and those on the subtraction output line 175 is proportional to both magnitude and sense of *y* scale distortion existing between the compared transparencies.

Again referring to FIG. 13, there is shown the *x* skew correlator 177 which is identical to the *x* parallax correlator shown in FIG. 15. The *x* skew correlator 177 receives on addition line 144 and subtraction line 145 the digital output from the *x* parallax correlator 143. Also connected to the *x* skew correlator is the *y* scale correlator 169 which provides control voltages on lines 178 and 179 identical to those appearing on its input lines 170 and 171. A positive voltage on line 178 represents a positive *y* reference signal value and causes the *x* skew correlator 177 to transmit directly pulses on addition input line 144 to addition output line 181 and pulses on subtraction input line 145 to subtraction output line 182. Conversely, a positive voltage on line 179 representing a negative *y* reference signal value causes the *x* skew correlator 177 to transfer pulses from addition input line 144 to subtraction output line 182 and pulses from subtraction input line 145 to addition output line 181. The digital outputs of the *x* skew correlator 177 on addition output line 181 and subtraction output line 182 are algebraically summed in the *x* skew add-subtract counter 183 to provide a measurement proportional to existing *x* skew distortion.

An understanding of how the *x* skew correlator 177 produces an output proportional to *x* skew distortion will be derived by considering its operation in connection with the examples of *x* skew distortion depicted in FIG. 10.

During positive *x* spot velocity in the upper half of the scanning raster, the video signal generated by the left image 130 will lag that generated by the right image 131 and a digital output will appear on addition line 62. Since the spots are moving in the positive *x* direction, the *x* parallax correlator 143 will transmit this output directly onto the addition line 144. Similarly, in the *x* skew correlator 177 the positive signal on line 178 representing the positive *y* reference signal value will produce direct transmittal of the digital signal from addition input line line 144 to *addition output line 181*. During positive *x* spot velocity in the lower half of the scanning raster, the video signal produced by the left image 130 will lead and an output will appear on subtraction line 63. This output will be transmitted directly to subtraction line 145 by the *x* parallax correlator 143 because of the positive *x* velocity. However, the negative *y* reference signal value will result in transfer of the signal by the *x* skew correlator 177 from subtraction line 145 to the *addition output line 181*. During negative *x* spot velocity in the upper half of the scanning raster, the video signal produced by the left image 130 will lead and an output again will appear on subtraction line 63. This output will be transferred to addition line 144 by the *x* parallax correlator 143 because of the negative *x* direction of spot travel and transmitted directly onto *addition output line 181* by the *x* skew correlator in response to the positive *y* reference signal value. During negative *x* spot velocity in the lower half of the scanning raster, the video signal generated by the left image will lag, resulting in a digital output signal on addition line 62. Responsive to the negative *x* direction of spot travel and its negative *y* value, the signal on addition line 62 is transferred to subtraction line 145 by the *x* parallax correlator 143 and then retransferred to *addition output line 181* by the *x* skew correlator 177. Thus, for all scanning spot positions and velocities, all of the digital output generated by the *x* skew distortion illustrated in FIG. 10 will eventually appear on addition output line 181. Obviously, *x* skew distortion of the opposite sense will produce a final output on subtraction output line 182 in an exactly reciprocal manner.

An indication of *y* skew distortion is provided by the *y* skew correlator 185 which is identical to the *x* parallax correlator shown in FIG. 15. Inputs to the *y* skew correlator 185 include the output lines 154 and 155 of the *y* parallax correlator 153 and the control lines 186 and 187 which provide control voltages identical to those on lines 158 and 162. The digital outputs of the *y* skew correlator on addition line 188 and subtraction line 189 are algebraically summed in the *y* skew add-subtract counter 191 to provide a measurement proportional to both the degree and sense of *y* skew distortion.

The operation of the *y* skew correlator 185 in determining *y* skew distortion such as that shown in FIG. 11 is entirely analogous to the foregoing discussion regarding operation of the *x* skew correlator 177 in connection with the distortion shown in FIG. 10. Therefore, a specific description of that operation has been omitted as unnecessary for a complete understanding of the invention.

Thus, the input signals to the counters 146, 156, 165, 173, 183 and 191 represent in digital form the interval lengths along the simultaneously scanned paths of the compared transparencies wherein disagreement as to image detail exists. Furthermore, the pulses on addition lines represent disagreement caused by relative detail shift in one direction and pulses on subtraction lines represent relative detail shift in the opposite direction. Therefore, with respect to each measured type of distortion, the summation of digital pulses on the appropriate addition line represents the total increments of detail shift in one direction and the summation of pulses on the appropriate subtraction line represents the total increments of detail shift in the opposite direction. Accordingly, the algebraic summations of both addition and subtraction pulses represent for the entire lengths of the paths scanned the composite incremental detail shifts in one direction or the other. The completely digital output can be used merely to identify the magnitude of existing parallaxes or can be fed into computers programmed to provide a wide variety of identification or control functions. Also, the digital outputs can be integrated to produce average output signals representing the magnitudes of existing distortions. Such signals can be used, as described in the above noted U.S. Pat. No. 3,432,674, to bring the compared transparencies into registration.

It should be understood that while the invention as described above produces actual measurement of only certain low order distortion, measurement of other types including those of higher order can be obtained if necessary or desirable in any particular application. Basically, this would entail simply the use of additional correlator circuits similar to those shown in FIG. 13. Obviously, the inclusion of additional components would increase both the complexity and cost of the overall system and would, therefore, be warranted only in those comparison applications requiring a determination of the relatively small misregistrations represented by the higher order distortions.

In dealing with extremely minute detail shifts in the compared displays, it is necessary that slope polarity comparisons be made between high frequency components of the video waveforms. However, high frequency comparison can produce erroneous indications of detail registration when relatively large shifts actually exist. For example, having identical photographs of an orchard with uniformly spaced rows of trees, comparison of the high frequency component in the produced waveforms can indicate registration when nonidentical rows in the two photographs are aligned. For this reason, the present invention is adapted for variable resolution operation. This permits the attainment of relatively coarse registration while operating with low resolution and a finer degree of registration while operating with higher resolution.

To provide variable resolution the invention utilizes, as shown in FIG. 1, the focus control circuit 197 connected to the scanning tubes 37 and 38. The focus control 197 can be operated either manually or automatically to control the focus and, therefore, the size of the scanning spots on the faces of the tubes 37 and 38. Thus, a relatively large spot would be used to scan comparatively large areas of the transparencies and the parallax error signals obtained therewith used to produce coarse registration. Subsequently, a smaller spot would be used to scan smaller areas and the resultant parallax error signals used to produce finer registration. This procedure would be followed until either the desired degree of registration was obtained or the limit of instrument resolution reached. The number of such iterations would be controlled by programmed logic and be dependent upon the relief and the quality of the data retained by the transparencies as well as upon spacing between scans and the amount of a priori information on which to predict the expected parallax and other distortions.

Although the above description and accompanying drawings relate to a preferred embodiment of the invention, it will be obvious that various modifications in circuitry and operating techniques could be utilized without departing from the basic and novel concepts of the invention. For example, exhibits other than photographic transparencies could be compared. Similarly, in some applications a given exhibit could be used to generate a first analog signal for comparison with a previously obtained reference signal retained on tape or other suitable storage mechanism. Also, although the described technique of summing the increments of slope disagreement along the compared scanning paths is preferred, the analogous relationship existing between increments of agreement could also be used. The summation of disagreements technique is preferred, however, because it provides a greater observable detail shift range than does the summation of agreements technique.

Therefore, it should be understood that within the scope of the appended claims, the invention can be practiced otherwise than as specifically described.

What is claimed is:

1. A multiple display comparison apparatus comprising:

electrical signal generating means for producing a first analog signal representing variable detail along a given path in a first exhibit and a second analog signal representing variable detail along a corresponding path in a second exhibit to be compared with the first exhibit, comparison means for comparing the slope polarities of said first and second analog signals, said comparison circuit means comprising detection means for determining the disagreement intervals along said given and corresponding paths wherein said first and second analog signals have slopes of opposite polarity, said comparison circuit means further comprising discriminator means for distinguishing first interval portions of said disagreement intervals resulting from slope polarity reversals in said first analog signal from second interval portions resulting from slope polarity reversals in said second analog signal.

2. A multiple display comparison apparatus according to claim 1 including measuring means for measuring the difference between the combined lengths of said first and second interval portions.

3. A multiple display comparison apparatus according to claim 1 wherein said comparison circuit means further comprises conversion means which produces a first binary signal having level changes which correspond to slope polarity reversals in said first analog signal and a second binary signal having level changes which correspond to slope polarity reversals in said second analog signal, and said detection means determines said disagreement intervals by comparing the levels of said first and second binary signals.

4. A multiple display comparison apparatus according to claim 3 wherein said comparison circuit means comprises discriminator means for distinguishing first interval portions of said disagreement intervals resulting from slope polarity reversals in said first analog signal from second interval portions of said disagreement intervals resulting from slope polarity reversals in said second analog signal.

5. A multiple display comparison apparatus according to claim 4 including measuring means for measuring the difference between the combined lengths of said first and second interval portions.

6. A multiple display comparison apparatus according to claim 5 wherein said comparison means produces a digital output representing said disagreement intervals.

7. A multiple display comparison apparatus according to claim 6 wherein said digital output representing said disagreement intervals comprises addition pulses on an addition line representing the combined lengths of said first interval portions and subtraction pulses on a subtraction line representing the combined lengths of said second interval portions.

8. A multiple display comparison apparatus according to claim 1 wherein said first and second exhibits comprise photographic images having homologous regions, and said first and second analog signals are video signals produced by directing scanning beams through said photographic images along said given and corresponding paths.

9. A multiple display comparison apparatus according to claim 8 wherein said comparison circuit means comprises discriminator means for distinguishing first interval portions of said disagreement intervals resulting from slope polarity reversals in said first analog signal from second interval portions of said disagreement intervals resulting from slope polarity reversals in said second analog signal.

10. A multiple display comparison apparatus according to claim 9 including measuring means for measuring the difference between the combined lengths of said first and second interval portions.

11. A multiple display comparison apparatus according to claim 8 wherein said comparison circuit means further comprises conversion means which produces a first binary signal having level changes which correspond to slope polarity reversals in said first analog signal and a second binary signal having level changes which correspond to slope polarity reversals in said second analog signal, and said measuring means determines said disagreement intervals by comparing the levels of said first and second binary signals.

12. A multiple display comparison apparatus according to claim 11 wherein said comparison circuit means comprises discriminator means for distinguishing first interval portions of said disagreement intervals resulting from slope polarity reversals in said first analog signal from second interval portions of said disagreement intervals resulting from slope polarity reversals in said second analog signal.

13. A multiple display comparison apparatus according to claim 12 including measuring means for measuring the difference between the combined lengths of said first and second interval portions.

14. A multiple display comparison apparatus according to claim 13 wherein said comparison means produces a digital output representing said disagreement intervals.

15. A multiple display comparison apparatus according to claim 14 wherein said digital output representing said disagreement intervals comprises addition pulses on an addition line representing the combined lengths of said first interval portions and subtraction pulses on a subtraction line representing the combined lengths of said second interval portions.

16. A multiple display comparison apparatus according to claim 10 including scanner tube means for directing said scanning beams through said photographic images.

17. A multiple display comparison apparatus according to claim 16 wherein said comparison circuit means further comprises conversion means which produces a first binary signal having level changes which correspond to slope polarity reversals in said first analog signal and a second binary signal having level changes which correspond to slope polarity reversals in said second analog signal, and said measuring means determines said disagreement intervals by comparing the levels of said first and second binary signals.

18. A multiple display comparison apparatus according to claim 17 wherein said comparison means produces a digital output representing said disagreement intervals.

19. A multiple display comparison apparatus according to claim 18 wherein said digital output representing said disagreement intervals comprises addition pulses on an addition line representing the combined lengths of said first interval portions and subtraction pulses on a substraction line representing the combined lengths of said second interval portions.

20. A multiple display comparison apparatus according to claim 19 including a raster generator for generating $x$ and $y$ scanning signals which develop the rasters for said scanner tube means.

21. A multiple display comparison apparatus according to claim 20 including $x$ reference circuit means adapted to produce an $x$ reference signal indicative of the slope polarity of said $x$ scanning signal, and a parallax analyzer circuit means comprising an $x$ parallax correlation means which receives and transmits said addition and subtraction output pulses and wherein said $x$ parallax correlation means reverses the sense of said pulses in response to $x$ scanning signal slope polarity reversals as indicated by said $x$ reference signal, 22. A multiple display comparison apparatus according to claim 21 wherein said measuring means comprises an $x$ parallax measurement means for indicating the quantitative difference between the addition and subtraction output pulses received from said $x$ parallax correlation means.

23. A multiple comparison apparatus according to claim 20 including $y$ reference circuit means adapted to produce a $y$ reference signal indicative of the slope polarity of said $y$ scanning signal, and a parallax analyzer circuit means comprising a $y$ parallax correlation means which receives and transmits said addition and subtraction output pulses and wherein said $y$ parallax correlation means reverses the sense of said pulses in response to $y$ scanning signal slope polarity reversals as indicated by said $y$ reference signal.

24. A multiple display comparison apparatus according to claim 23 wherein said measuring means comprises a $y$ parallax measurement means for indicating the quantitative difference between the addition and subtraction output pulses received from said $y$ parallax correlation means.

25. A multiple display comparison apparatus according to claim 24 including $x$ reference circuit means adapted to produce an $x$ reference signal indicative of the slope polarity of said $x$ scanning signal, and wherein said parallax analyzer circuit means further comprises an $x$ parallax correlation means which receives and transmits said addition and subtraction output pulses and wherein said $x$ parallax correlation means reverses the sense of said pulses in response to $x$ scanning signal slope polarity reversals as indicated by said $x$ reference signal.

26. A multiple display comparison apparatus according to claim 25 wherein said measuring means further comprises an $x$ parallax measurement means for indicating the quantitative difference between the addition and subtraction output pulses received from said $x$ parallax correlation means.

27. A multiple display comparison apparatus according to claim 26 including an $x$ polarity circuit means responsive to said $x$ scanning signal and adapted to provide an $x$ polarity output signal indicative of which vertical half of said scanner tube means is receiving said scanning beam, and wherein said parallax analyzer circuit means further comprises an $x$ scale correlation means which receives and transmits addition and subtraction output pulses from said $x$ parallax correlation means and is adapted to reverse their sense in response to scanning beam position changes indicated by said $x$ polarity output signal.

28. A multiple display comparison apparatus according to claim 27 wherein said measuring means further comprises an $x$ scale measuring means for indicating the quantitative difference between the addition and subtraction output pulses received from said $x$ scale correlation means.

29. A multiple display comparison apparatus according to claim 28 including a $y$ polarity circuit means responsive to said $y$ scanning signal and adapted to provide a $y$ polarity output signal indicative of which horizontal half of said scanner tube means is receiving said scanning beam, and wherein said parallax circuit means further comprises a $y$ scale correlation means which receives and transmits addition and subtraction output pulses from said $y$ parallax correlation means and is adapted to reverse their sense in response to scanning beam position changes indicated by said $y$ polarity output signal.

30. A multiple display comparison apparatus according to claim 29 wherein said measuring means further comprises a $y$ scale measurement means for indicating the quantitative difference between the addition and subtraction output pulses received from said $y$ scale correlation means.

31. A multiple display comparison apparatus according to claim 30 wherein said parallax analyzer circuit means further comprises an $x$ skew correlation means which receives and transmits addition and subtraction output pulses from said $x$ parallax correlation means and is adapted to reverse their sense in response to scanning beam position changes indicated by said $y$ polarity output signal.

32. A multiple display comparison apparatus according to claim 31 wherein said measuring means further comprises an $x$ skew measurement means for indicating the quantitative difference between the addition and subtraction output pulses received from said $x$ skew correlation means.

33. A multiple display comparison apparatus according to claim 32 wherein said parallax analyzer circuit means further comprises a $y$ skew correlation means which receives and transmits addition and subtraction output pulses from said $y$ parallax correlation means and is adapted to reverse their sense in response to scanning beam position changes indicated by said $x$ polarity output signal.

34. A multiple display comparison apparatus according to claim 33 wherein said measuring means further comprises a $y$ skew measurement means for indicating the quantitative difference between the addition and subtraction output pulses received from said $y$ skew correlation means.

35. A multiple display comparison apparatus according to claim 2 including control means for varying the effective widths of said given and corresponding paths.

36. A method for comparing relative location of detail in similar exhibits comprising the steps of;
producing a first electrical analog signal representing variable detail along a given path in one exhibit,
producing a second electrical analog signal representing variable detail along a corresponding path in another exhibit,
comparing the slope polarities of the first and second analog signals,
determining the disagreement intervals along said given and corresponding paths wherein said first and second analog signals have slopes of opposite polarity,
and distinguishing between portions of said disagreement intervals resulting from slope polarity reversals in said first analog signal and those resulting from slope polarity reversals in said second analog signal.

37. A method according to claim 36 including the step of measuring the differences between the combined lengths of each of said disagreement interval portions.

38. A method according to claim 37 wherein said comparing step comprises the steps of producing a first binary signal having level changes corresponding to slope polarity reversals in said first analog signal and a second binary signal having level changes corresponding to slope polarity reversals in said second analog signal.

References Cited

UNITED STATES PATENTS

| | | |
|---|---|---|
| 3,372,615 | 3/1968 | Birnbaum. |
| 3,432,674 | 3/1969 | Hobrough _____ 250—220 |

RICHARD MURRAY, Primary Examiner

H. W. BRITTON, Assistant Examiner

U.S. Cl. X.R.

178—6.5; 250—220; 356—156